(12) United States Patent
Xiao

(10) Patent No.: US 6,637,879 B1
(45) Date of Patent: Oct. 28, 2003

(54) DETACHABLE SHELTER FRAME FOR MAGNETIC SPECTACLE SET

(75) Inventor: Tony Xin Xiao, Walnut, CA (US)

(73) Assignee: Viva International Corp, Somerville, NJ (US)

( * ) Notice: Subject to any disclaimer, the term of this patent is extended or adjusted under 35 U.S.C. 154(b) by 0 days.

(21) Appl. No.: 10/365,269

(22) Filed: Feb. 11, 2003

(51) Int. Cl.[7] .................................................. G02C 9/00
(52) U.S. Cl. .......................................... 351/47; 351/57
(58) Field of Search ............................. 351/47, 57, 48, 351/58, 44, 41, 158

(56) References Cited

U.S. PATENT DOCUMENTS 6,132,040 A  * 10/2000  Xiao ........................... 351/47

* cited by examiner

Primary Examiner—Hung Xuan Dang
(74) Attorney, Agent, or Firm—Raymond Y. Chan; David and Raymond Patent Group

(57) ABSTRACT

A detachable shelter frame, adapted for mounting in front of a primary spectacle frame, includes a shelter frame for supporting two auxiliary lenses thereon and two interlocking arrangements which are provided at two sides of the auxiliary lenses respectively. Each of the interlocking arrangements includes a supporting arm rearwardly extending from the shelter frame towards an engagement member of the primary spectacle frame and a magnetic seat which is connected to the respective supporting arm and arranged to magnetically attach to the respective engagement member from behind. Each of the magnetic seats has a side opening having a width equal to or slightly larger than a height of the respective engagement member in such a manner that when the magnetic seats are magnetically attached with the engagement members respectively, the engagement members are capable of linearly sliding through the side openings respectively.

38 Claims, 7 Drawing Sheets

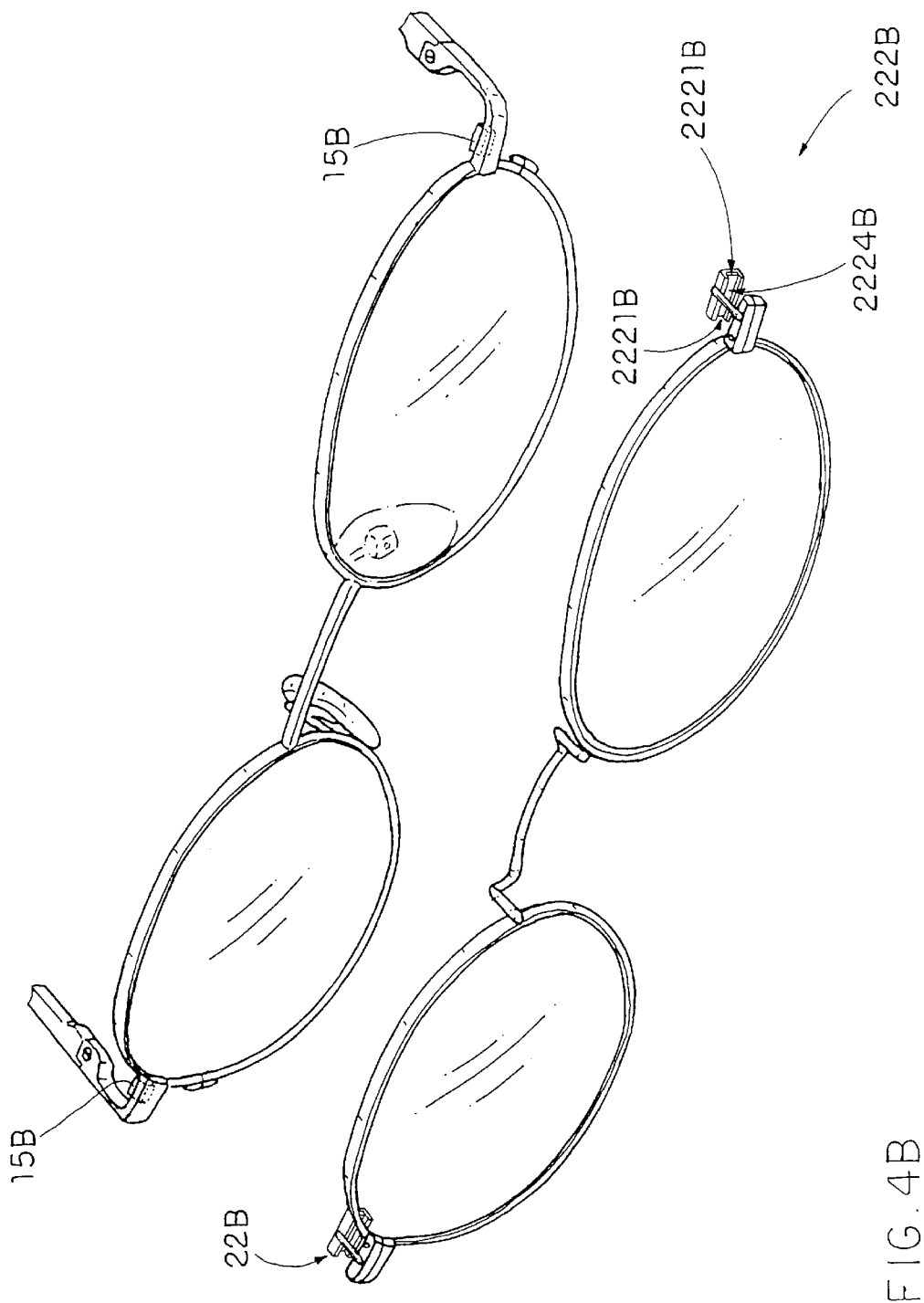

US 6,637,879 B1

DETACHABLE SHELTER FRAME FOR MAGNETIC SPECTACLE SET

BACKGROUND OF THE PRESENT INVENTION

1. Field of Invention

The present invention relates to a spectacle set, and more particularly to a detachable shelter frame for a magnetic spectacle set, wherein the detachable shelter frame is capable of transversely sliding with respect to a primary spectacle frame so as to prevent the detachable shelter frame from accidentally detaching from the primary spectacle frame.

2. Description of Related Arts

An auxiliary shelter frame is widely used today for mounting on a primary spectacle frame. Especially, an auxiliary shelter frame with magnetic attachment is commonly used in recent market. The advantage of the magnetic shelter frame is that when the shelter frame is placed in front of the primary spectacle frame, due to the magnetic attraction, the shelter frame will be automatically guided and attracted by the primary spectacle frame that has magnets embedded thereon, so as to securely mounted the shelter frame in front of the primary spectacle frame. Thus, the wearer can easily use one hand to attach or detach the shelter frame during exercising or driving.

In U.S. Pat. No. 6,116,732, the applicant of the present invention generally suggests a shelter frame comprising two side interlocking means provided at two outer sides of the two auxiliary lenses respectively for interlocking with two side extensions of the primary spectacle frame respectively, wherein each of the side interlocking means comprises a supporting arm extended rearwardly for riding on top of the respective side extension of the primary spectacle frame, and a magnetic seat downwardly connected from the supporting arm for magnetically attracting from behind the respective side extension and engaging with the respective engagement means of the side extension so as to securely mount the shelter frame in front of the primary spectacle frame.

Likewise, each of the side interlocking means comprises a supporting arm extended rearwardly for riding on the bridge of the primary spectacle frame and a magnetic seat downwardly connected from the supporting arm for magnetically attracting from behind the bridge and engaging with the engagement means of the bridge so as to securely mount the shelter frame in front of the primary spectacle frame.

In U.S. Pat. No. 6,402,318, the applicant of the present invention further discloses the primary spectacle frame comprises a pair of lens rims for mounting a pair of lenses in position, wherein each of the lens rims comprises a frame locker for fastening up two ends of the respective lens rim to securely lock up the respective lens within the respective lens rim. The detachable shelter frame comprises two side interlocking means provided at two sides of the auxiliary lenses respectively for interlocking with the two frame lockers of the primary spectacle frame. Accordingly, the '318 patent suggests that the two frame lockers of the two lens rims are respectively positioned adjacent to two side extensions of the primary spectacle frame such that the two side interlocking means are rearwardly extended and aligned to magnetically attract with the two frame lockers respectively. Alternatively, the two frame lockers are respectively positioned adjacent to two ends of the bridge of the primary spectacle frame. In addition, the two frame lockers are also capable of positioning at two upper or lower sides of the lens rims respectively.

It is no doubt that the above configurations of the shelter frame can securely mount in front of the primary spectacle frame. However, when two temples or side extensions of the primary spectacle frame are accidentally or intentionally pulled away from each other, a distance between the two engagement means will be increased and the interlocking means of the shelter frame may be forced to misalign and/or disengage with the engagement means of the primary spectacle frame respectively, so that the shelter frame may easily drop off from the primary spectacle frame once the magnetic seat is disengaged with the engagement means. In other words, no transverse movement of the primary spectacle frame is allowed when the shelter frame is mounted in front of the primary spectacle frame. Therefore, there still has a room for improvement of the magnetic spectacle set.

SUMMARY OF THE PRESENT INVENTION

A main object of the present invention is to provide a detachable shelter frame for a magnetic spectacle set, wherein the detachable shelter frame is able to transversely make self adjustment by sliding with respect to the primary spectacle frame so as to prevent the detachable shelter frame from accidentally detaching from the primary spectacle frame.

Another object of the present invention is to provide a detachable shelter frame for a magnetic spectacle set, wherein the shelter frame can be precisely and easily attached in front of the primary spectacle frame by magnetic attraction. Moreover, the shelter frame is arranged to interlock with the primary spectacle frame so that the shelter frame is securely mounted in front of the primary spectacle frame.

Another object of the present invention is to provide a detachable shelter frame for a magnetic spectacle set, wherein the interlocking means are rearwardly extended from the shelter frame to magnetically interlock with the primary spectacle frame from behind at any position, such as at two side extensions, two rim lockers, or even at two inner sides of the lenses.

Another object of the present invention is to provide a detachable shelter frame for a magnetic spectacle set, wherein the wearer may merely use one hand to attach or detach the detachable shelter frame during exercising or driving.

Another object of the present invention is to provide a detachable shelter frame for a magnetic spectacle set, wherein no magnet is needed to embed on the primary spectacle frame so as to further reduce the weight of the primary spectacle frame. Furthermore, the ornamental appearance of the primary spectacle frame can be maintained wherein the primary spectacle frame is exactly identical to a common spectacle frame even though the shelter frame is removed.

Another object of the present invention is to provide a detachable shelter frame for a magnetic spectacle set, wherein the primary spectacle frame does not require altering its original structural design, so as to minimize the manufacturing cost of the primary spectacle frame incorporating with the shelter frame.

Accordingly, in order to accomplish the above objects, the present invention provides a detachable shelter frame adapted for detachably mounting in front of a primary spectacle frame which comprises a frame body for mounting a pair of lenses in position, wherein the frame body comprises a primary bridge connected between the two lenses, two side extensions provided at two outer sides of the lenses for coupling with two temples respectively, and two engagement members rearwardly provided on the frame body.

The detachable shelter frame comprises a shelter frame for supporting two auxiliary lenses thereon and two interlocking arrangements which are provided at two sides of the auxiliary lenses respectively for interlocking with the frame body so as to securely mount the detachable shelter frame in front of the primary spectacle frame.

Each of the interlocking arrangements comprises a supporting arm rearwardly extending from the shelter frame towards the respective engagement member of the primary spectacle frame and a magnetic seat which is connected to the respective supporting arm and arranged to magnetically attach to the respective engagement member from behind so as to hold the shelter frame of the detachable shelter frame in front of the frame body of the primary spectacle frame in position.

Each of the magnetic seats has a side opening having a width equal to or slightly larger than a height of the respective engagement member in such a manner that when the magnetic seats are magnetically attached with the engagement members respectively, the engagement members are capable of linearly sliding out of the magnetic seats through the side openings respectively.

These and other objectives, features, and advantages of the present invention will become apparent from the following detailed description, the accompanying drawings, and the appended claims.

BRIEF DESCRIPTION OF THE DRAWINGS

FIGS. 4A and 4B illustrate an alternative mode of the magnetic seat of the detachable shelter frame according to the above first preferred embodiment of the present invention.

DETAILED DESCRIPTION OF THE PREFERRED EMBODIMENTS

Figure 1:
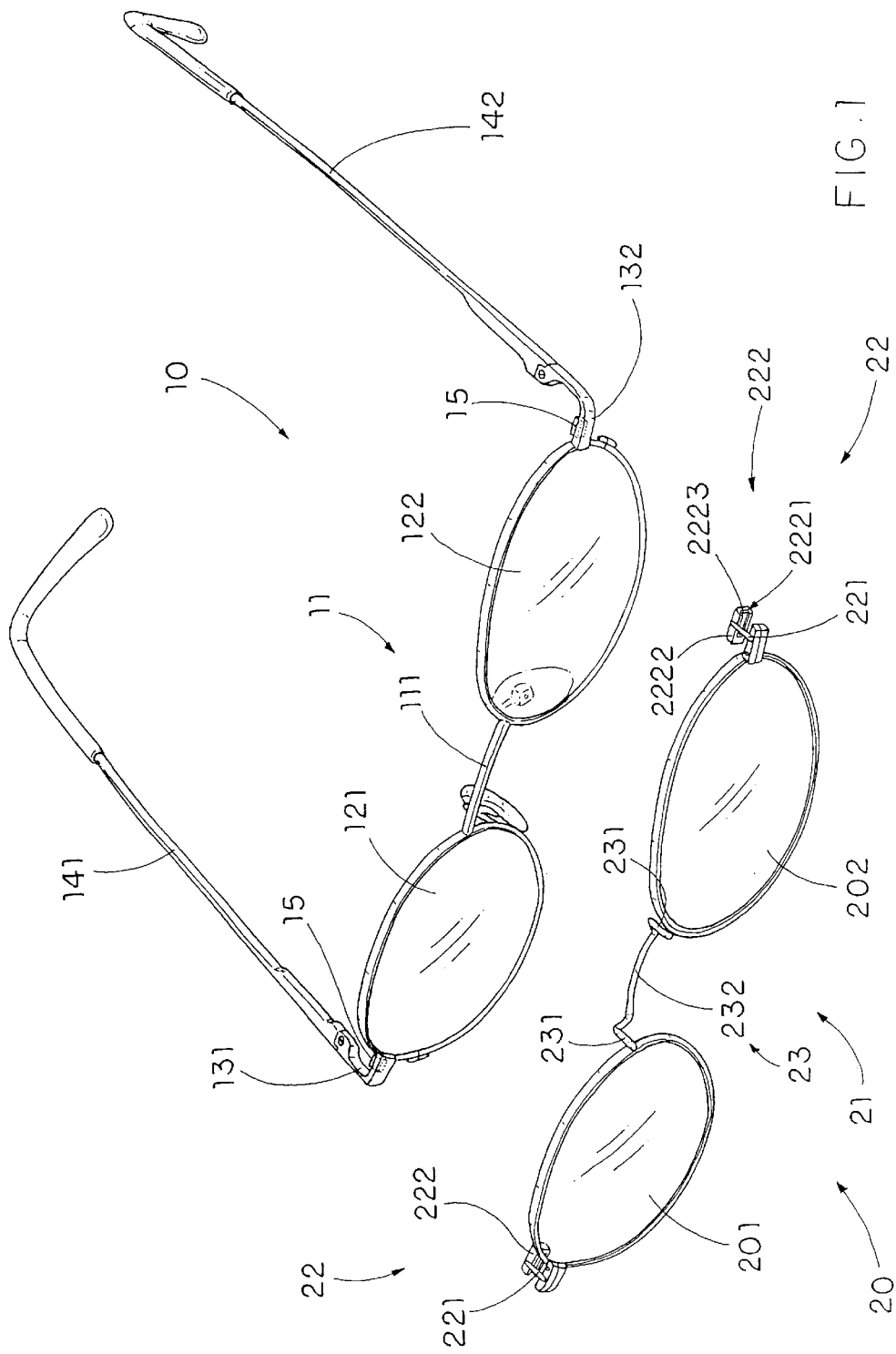
FIG. 1 is a perspective view of a detachable shelter frame for a magnetic spectacle set according to a first preferred embodiment of the present invention.

Referring to FIG. 1 of the drawings, a spectacle set according to a first preferred embodiment of the present invention illustrated, wherein the spectacle set comprises a primary spectacle frame 10 and a detachable shelter frame 20 for detachably mounting in front of the primary spectacle frame 10.

The primary spectacle frame 10 comprises a frame body 11 for mounting a pair of lenses 121, 122 in position, wherein the frame body 11 comprises a primary bridge 111 connected between the two lenses 121, 122, two side extensions 131, 132 provided at two outer sides of the lenses 121, 122 for coupling with two temples 141, 142 respectively, and two engagement members 15 rearwardly provided on the frame body 11.

The frame body 11 of the primary spectacle frame 10 can be constructed as the conventional spectacle frame to have a pair of lens rims 110, as shown in FIG. 1 or the rimless frame that the primary bridge 111 and the two side extensions 131, 132 are directly fastened to the edges of the two lenses 121, 122. In other words, the primary spectacle frame 10 does not require modifying its original structure for mounting the detachable shelter frame 20 thereon.

The detachable shelter frame 20 comprises a shelter frame 21 for supporting two auxiliary lenses 201, 202 thereon and two interlocking arrangements 22 which are provided at two sides of the auxiliary lenses 201, 202 respectively for interlocking with the frame body 11 so as to securely mount the detachable shelter frame 20 in front of the primary spectacle frame 10.

Each of the interlocking arrangements 22 comprises a supporting arm 221 rearwardly extending from the shelter frame 21 towards the respective engagement member 15 of the primary spectacle frame 10 and a magnetic seat 222 which is connected to the respective supporting arms 221 and arranged to magnetically attach to the respective engagement members 15 so as to hold the shelter frame 21 of the detachable shelter frame 20, in front of the frame body 11 of the primary spectacle frame 10, in position.

Each of the magnetic seats 222 has a side opening 2221 having a width slightly larger than a height of the respective engagement member 15 in such a manner that when the magnetic seats 222 are magnetically attached to the engagement members 15 respectively, the engagement members 15 are able to make self adjustment by transversely sliding out of the magnetic seats 222 through the side openings 2221 respectively when, for example, the temples 141, 142 or the two side extensions 131, 132 are pulled to move away from each other.

According to the first embodiment, the two engagement members 15 are rearwardly and integrally protruded at two outer sides of the lenses 121, 122 respectively. Preferably, the two engagement members 15 are integrally protruded at the two side extensions 131, 132 of the frame body 11 respectively. The two side extensions 131, 132 are preferred to be made of soft-magnetic metal having magnetic attraction ability such as mild steel, low carbon steel and high grade steel. Therefore, the engagement members 15 are also made of soft-magnetic metal that is attractive to magnetic material such as permanent magnet.

As shown in FIG. 1, the two supporting arms 221 are rearwardly extended from two outer sides of the auxiliary lenses 201, 202 for riding on top of the side extensions 131, 132 towards the engagement members 15 respectively, wherein the two magnetic seats 222 are arranged to magnetically attach to the engagement members 15 at the two side extensions 131, 132 respectively in such a manner that the shelter frame 21 is interlocked with the frame body 11 by the two interlocking arrangements 22 when the detachable shelter frame 20 is mounted in front of the primary spectacle frame 10.

Each of the magnetic seats 222 comprises a magnetic housing 2222 downwardly extended from the respective supporting arm 221, wherein each magnetic seat 222 is made of non-magnetic material or soft-magnetic metal having magnetic attraction ability such as mild steel, low carbon steel and high grade steel, and a magnet 2223 mounted in the magnetic housing 2222, which is arranged to face toward and align with the respective engagement member 15 of the shelter frame 21 when the detachable shelter frame 20 is mounted in front of the primary spectacle frame 10.

Figure 2:
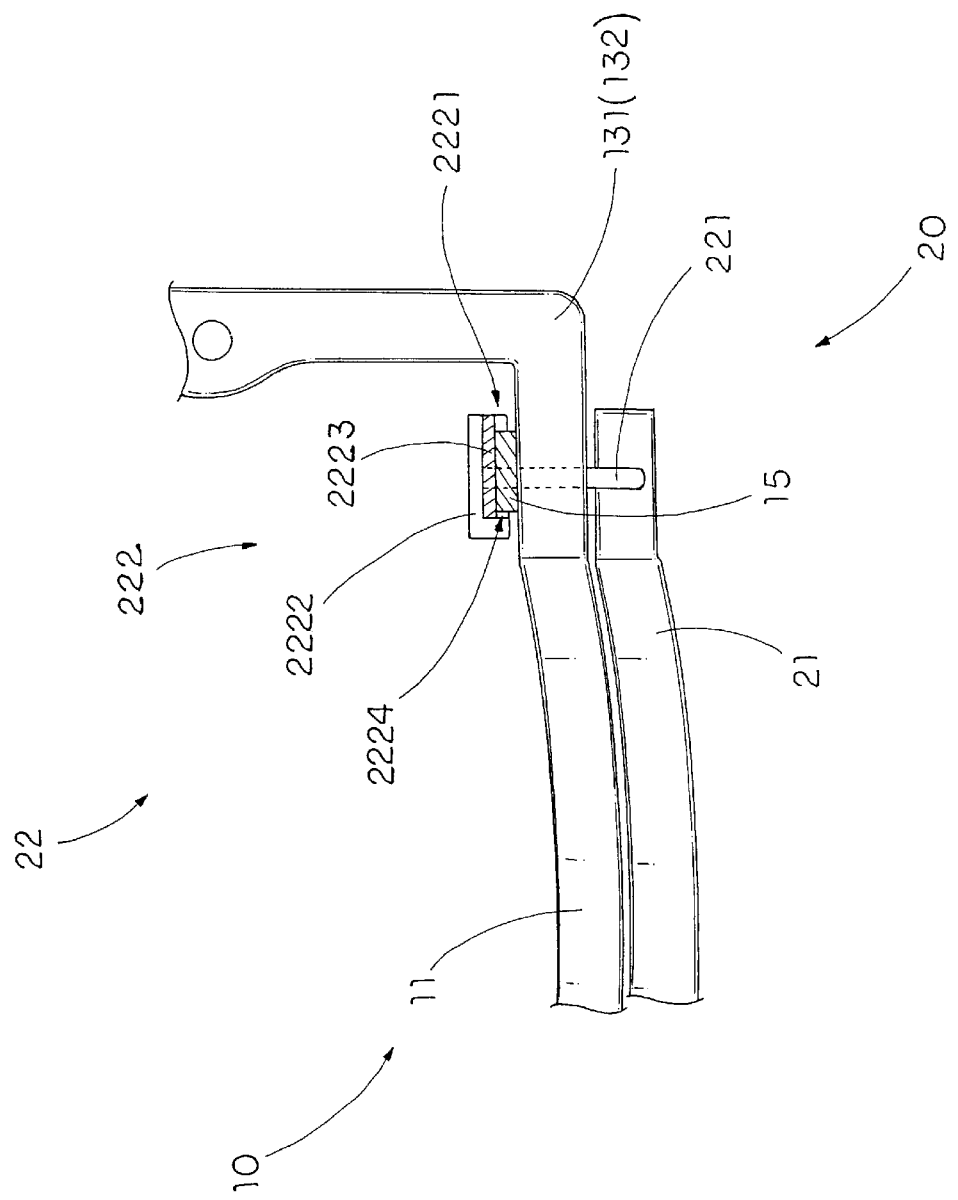
FIG. 2 is a sectional view of the detachable shelter frame for the magnetic spectacle set according to the above first preferred embodiment of the present invention.

Each of the magnets 2223 has a thickness smaller than a depth of the respective magnetic housing 2222, so as to define an engaging groove 2224 when the magnet 2223 is embedded in the magnetic housing 2222 for fittedly engaging with the respective engagement member 15. In other words, the engagement members 15 are received in the two engaging grooves 2224 respectively, so as to further guide the interlocking arrangement 22 of the detachable shelter frame 20 to magnetically attach to the engagement members 15 of the primary spectacle frame 10 respectively. As shown in FIG. 2, the engaging groove 2224 is formed on a front face of the respective magnetic seat 222 and arranged to fittedly receive the respective engagement member 15 when the shelter frame 21 is mounted in front of the frame body 11, so as to further interlock the detachable shelter frame with the primary spectacle frame 10.

As shown in FIG. 2, the side opening 2221 is formed at two outer sides of the magnetic housing 2222 wherein the engaging groove 2224 is capable of communicating with outside through the respective side opening 2221 in such a manner that when the engagement member 15 is received in the engaging groove 2224, the engagement member 15 is capable of transversely and outwardly sliding out of the engaging groove 2224 through the respective side opening 2221. In other words, each of the magnetic housing 2222 has a C-shaped cross section to form the side opening 2221 to enable the respective engagement member 15 to slide therethrough, as shown in FIG. 1.

It is well known that the magnetic attraction force between two magnets is a linear axial force that has a low resistance to shear force applied between the two magnets. By means of the engagement structure of the two protruding engagement members 15 and the two indented engaging grooves 2224, the axial magnetic attraction between the engagement members 15 of the primary spectacle frame 10 and the two magnets 2223 of the shelter frame 21 is ensured by enhancing the resistance to any shear force that may be applied to the two engagement members 15. Moreover, any upward, downward, or sideward movements of the shelter frame 21 can also be blocked and prevented so as to ensure the shelter frame 21 being firmly mounted on the primary spectacle frame 10.

Figure 3:
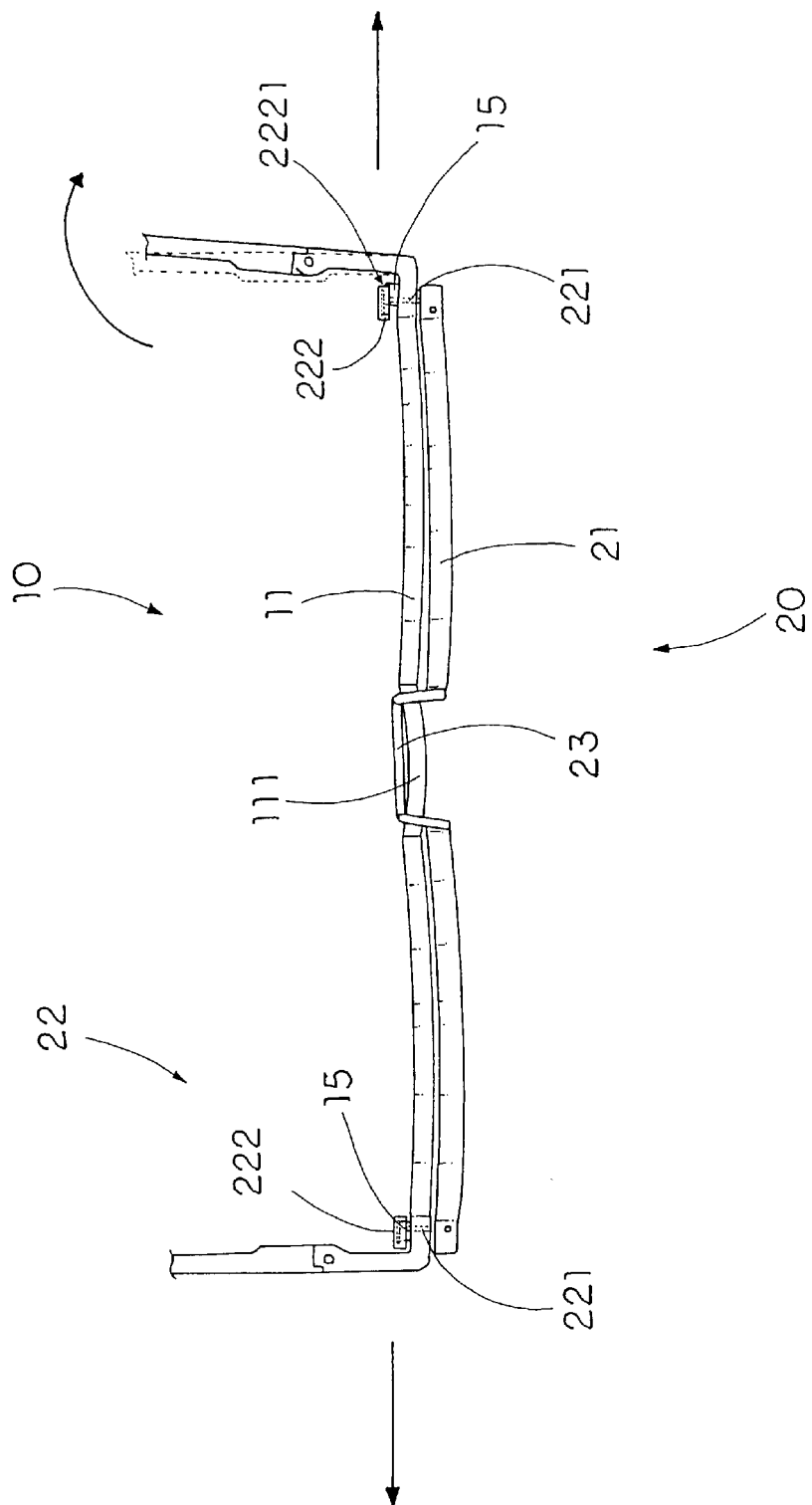
FIG. 3 is a top view of the detachable shelter frame mounted in front of the primary spectacle frame according to the above first preferred embodiment of the present invention, illustrating a linear movement of the primary spectacle frame.

In addition, when the primary spectacle frame 10 is pulled outwardly at two sides thereof to force a linear movement, the two engagement members 15 are forced to slide outwardly from the engaging grooves 2224 through the side openings 2221 respectively, as shown in FIG. 3. However, when the pulling force applied on the primary spectacle frame 10 is released, the frame body 11 is rebounded to its original form such that the engagement members 15 will slide back into the engaging grooves 224 respectively.

It is worth to mention that since the shelter frame 21 not only interlocks with the frame body 11 via the supporting arms 221 but also magnetically attracts with the frame body 11 via the magnetic seats 222, the detachable shelter frame 20 will securely mount in front of the primary spectacle frame 10 even though the primary spectacle frame 10 may conduct such linear movement. However, the side openings 2221 allow the linear movement of the primary spectacle frame 10 to prevent the detachable shelter frame 20 from dropping off from the primary spectacle frame 10, especially during exercise or being hit on the primary spectacle frame 10.

According to the preferred embodiment, the detachable shelter frame 20 further comprises a clip bridge 23 extended between the two auxiliary lenses 201, 202 for securely engaging with the primary bridge 111 of the primary spectacle frame 10 so as to further secure the attachment of the detachable shelter frame 20 in front of the primary spectacle frame 10.

The clip bridge 23 of the detachable shelter frame 20 is in U-shaped and comprises two rearwardly extending side wires 231 adapted for supporting on two ends of the primary bridge 111 of the frame body 11 and a downwardly curved clipping wire 232 extending in front of the primary bridge 111, so that the clip bridge 23 can be securely clipped on the primary bridge 111 when the detachable shelter frame 20 is mounted behind the primary spectacle frame 10.

In order to mount the shelter frame 21 in front of the primary spectacle frame 10, the wearer may simply use one hand to put the shelter frame 21 in front of the frame body 11 and drop it down. The clip bridge 23 will be securely clipped on the primary bridge 111 of the primary spectacle frame 10, so as to securely interlock the shelter frame 21 with the frame body 11. Moreover, due to the magnetic attraction, the two magnetic seats 222 of the shelter frame 21 are magnetically attracted to the engagement members 15 of the frame body 11 from behind respectively, so as to guide the shelter frame 21 to automatically align with the primary spectacle frame 10. So, the present invention provides not only the magnetic attraction but also the interlocking engaging for securely mounting the shelter frame 21 of the detachable shelter frame 20 behind the frame body 11 of the primary spectacle frame 10.

The wearer can also detach the shelter frame 21 from the frame body 11 of the primary spectacle frame 10 easily by slightly pushing the shelter frame towards the primary spectacle frame 10 until the two magnetic seats 222 move apart from the two engagement members 15 respectively, so as to release the magnetic engagement between the shelter frame 21 and the frame body 11. Then, at the same time, the wearer may detach the shelter frame 21 by simply lifting it up from the primary spectacle frame 10 with one hand, so as to detach the clip bridge 23 from the primary bridge 111 of the primary spectacle frame 10. In other words, the wearer may simply use one hand to attach or detach the detachable shelter frame 20 from the primary spectacle frame 10. It is more convenience when the wearer is exercising or driving because it will be dangerous for him or her to use both hands to wear the detachable shelter frame 20.

It is worth to mention that the engagement members 15 can be embodied as two rim lockers as described in background, wherein the two rim lockers of the engagement members 15 are respectively provided at two outer sides of the lenses 121, 122 of the frame body 11.

Figure 4A:
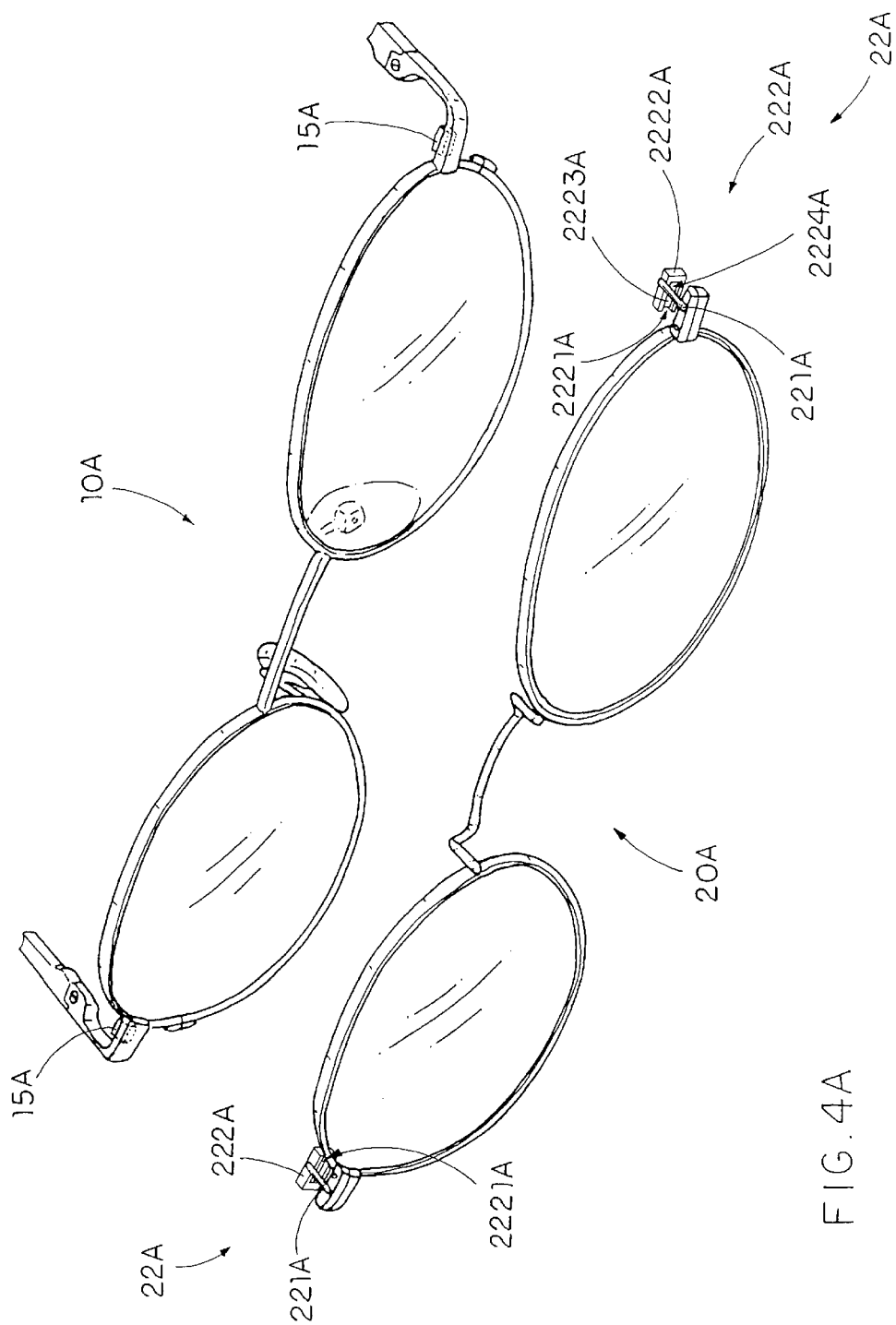

FIG. 4A illustrates a first alternative mode of the magnetic seat 222A of the interlocking arrangement 22A of the detachable shelter frame 20A, wherein the side openings 2221A are formed at two inner sides of the magnetic seat 222A for allowing the engagement members 15A of the primary spectacle frame 10A to slide through.

Each of the magnets 2223A has a thickness smaller than a depth of the respective magnetic housing 2222A so as to define an engaging groove 2224A when the magnet 2223A is embedded in the magnetic housing 2222A for fittedly engaging with the respective engagement member 15A.

Each of the side openings 2221A is formed at two inner sides of the magnetic housing 222A wherein the engaging groove 2224A is capable of communicating with outside through the respective side opening 2221A in such a manner that when the engagement member 15A is received in the engaging groove 2224A, the engagement member 15A is able to inwardly slide out of the engaging groove 2224A to outside through the respective side opening 2221A.

It is apparent that the side openings 2221B of the interlocking arrangement 22B are formed at both the outer and inner sides of each engaging groove 2224B of the magnetic housing 222B, as shown in FIG. 4B, such that when the engagement member 15B is received in the engaging groove 2224B of the magnetic seat 222B, the engagement member 15B is capable of sidewardly sliding out of the engaging groove 2224B through the respective side opening 2221B.

Figure 5A:
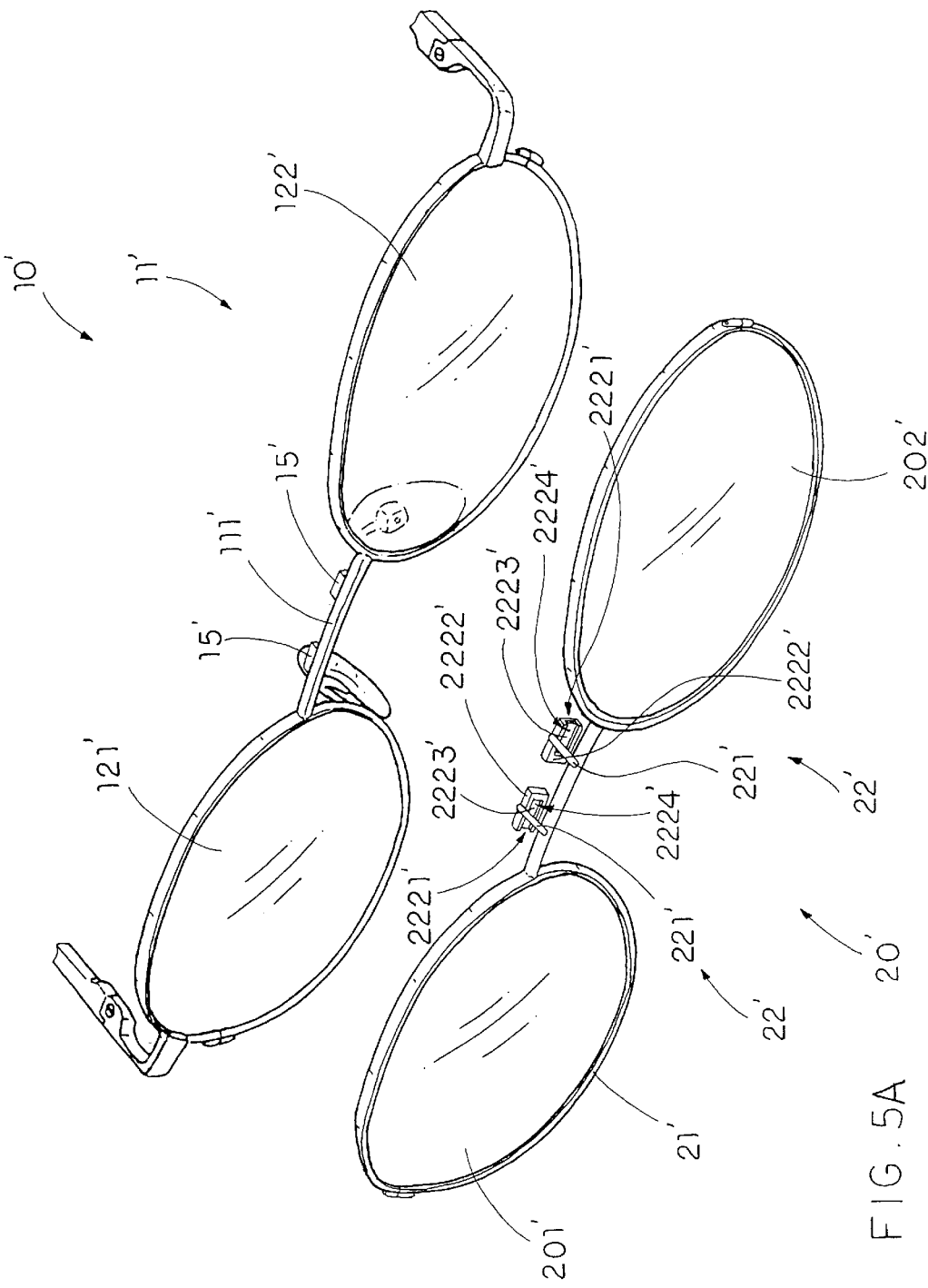
FIG. 5A is a perspective view of a detachable shelter frame for a magnetic spectacle set according to a second preferred embodiment of the present invention.

As shown in FIG. 5A, a spectacle set according to a second embodiment illustrates an alternative mode of the first embodiment of the present invention, wherein the magnetic interlocking attachment between the primary spectacle frame 10' and the detachable shelter frame 20' can be located at different positions thereof.

According to the second preferred embodiment, the two engagement members 15' are provided at two inner sides of the lenses 121', 122' of the frame body 11', i.e. the inner side of bridge 111', wherein each of the engagement member 15' is made of a kind of metal having magnetic attraction ability that is attractive to magnetic material.

Each of the interlocking arrangements 22' comprises a supporting arm 221' rearwardly extending from the shelter frame 21' at a respective inner side of the auxiliary lens 201', 202' for riding on the primary bridge 111' of the frame body 11' towards the respective engagement member 15' of the primary spectacle frame 10' and a magnetic seats 222' which is connected to the respective supporting arm 221' and arranged to magnetically attach to the respective engagement member 15' so as to hold the shelter frame 21' of the detachable shelter frame 20' in front of the frame body 11' of the primary spectacle frame 10' in position.

Moreover, the supporting arms 221' also function as the bridge clip to ride on top of the primary bridge 111' of the frame body 11' for engaging with the primary bridge 111' so as to securely interlock the shelter frame 21' in front the primary spectacle frame 10' to prevent the upward, downward, and sideward movement of the shelter frame 21' with respect to the frame body 11'.

Each of the magnetic seats 222' comprises a magnetic housing 2222' downwardly extended from the respective supporting arm 221', wherein each magnetic seat 222' is made of non-magnetic material or soft-magnetic metal having magnetic attraction ability such as mild steel, low carbon steel and high grade steel, and a magnet 2223' mounted in the magnetic housing 2222', which is arranged to face toward and align with the respective engagement member 15" of the shelter frame 21' when the detachable shelter frame 20' is mounted in front of the primary spectacle frame 10'.

Each of the magnets 2223' has a thickness smaller than a depth of the respective magnetic housing 2222' so as to define an engaging groove 2224' when the magnet 2223' is embedded in the magnetic housing 2222' for fittedly engaging with the respective engagement member 15'.

As shown in FIG. 5A, the side opening 2221' is formed at the outer side of the respective magnetic housing 2222' wherein the engaging groove 2224' is capable of communicating with outside through the respective side opening 2221' in such a manner that when the engagement member 15' is received in the engaging groove 2224', the engagement member 15' is capable of transversely and outwardly sliding out of the engaging groove 2224' through the respective side opening 2221'.

Accordingly, the side openings 2221' can be formed at inner sides of the magnetic housings 2222' for allowing the engagement members 15' inwardly sliding out of the engaging grooves 2224' respectively. Likewise, the side openings 2221' can also be formed at both the inner and outer sides of each magnetic housing 222' for allowing the engagement members 15' sidewardly sliding out of the engaging grooves 2224' respectively, as mentioned in the alternative mode of the first embodiment.

Figure 5B:
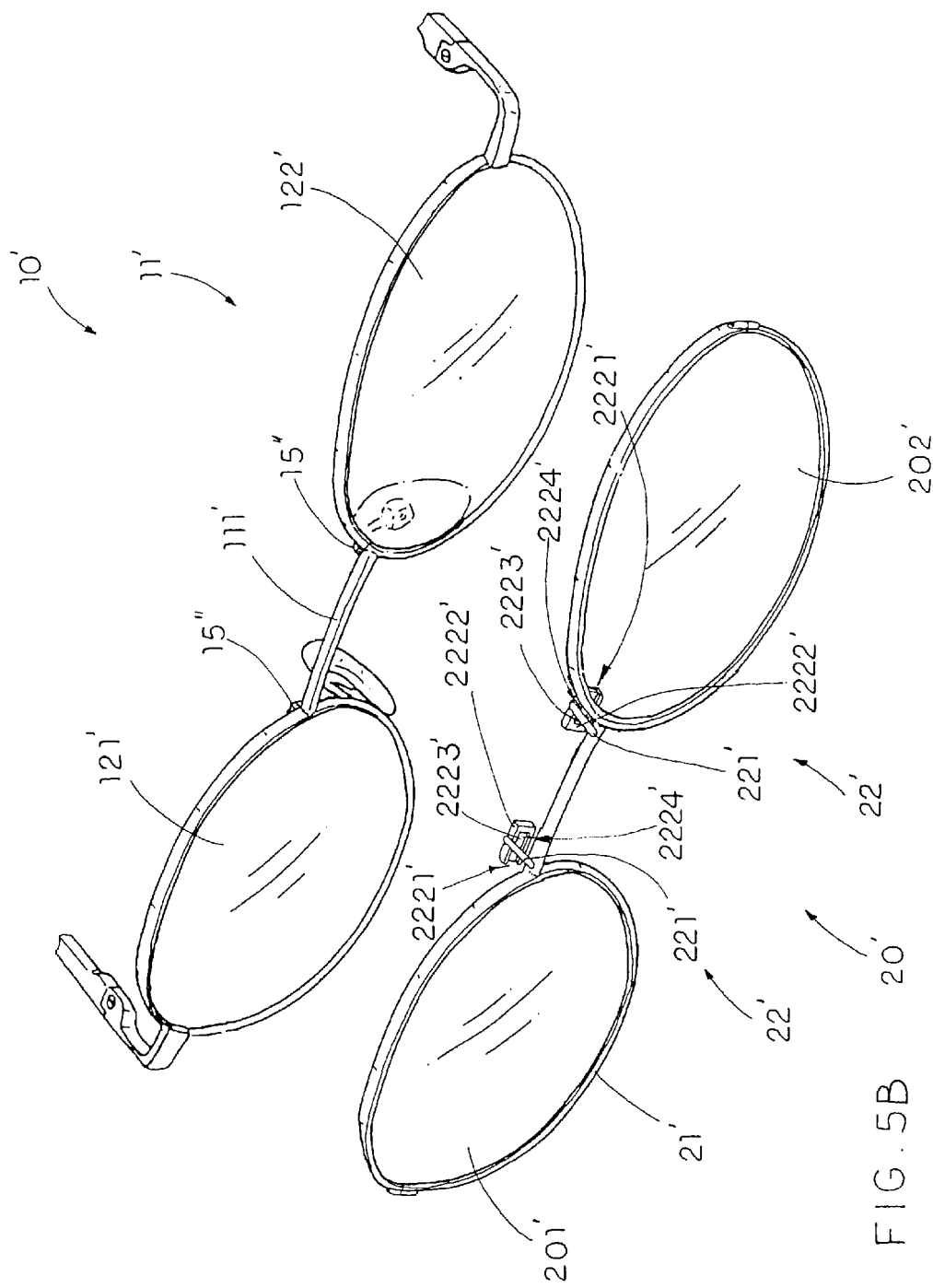
FIG. 5B is a perspective view of a detachable shelter frame for a magnetic spectacle set according to an alternative mode of the above second preferred embodiment of the present invention.

According to an alternative mode of the second preferred embodiment, as shown in FIG. 5B, the two engagement members 15" are embodied as two rim lockers provided at two inner sides of the lenses 121', 122' of the primary spectacle frame 10' respectively. Alternatively, the engagement members 15' can be rearwardly protruded from two ends of the primary bridge 111' respectively for magnetically attaching with the magnetic seats 222' of the detachable shelter frame 20' respectively. In other words, the original structural design of the primary spectacle frame 20' does not need to be altered in order to mount the detachable shelter frame 20' thereto, so that the detachable shelter frame 20' can be incorporated with any conventional primary spectacle frame having the engagement members 15" provided at either two outer sides or two inner sides of the lenses 121', 122' of the primary spectacle frame 10 as mentioned in the background.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A magnetic spectacle set, comprising:

a primary spectacle frame which comprises a frame body for mounting a pair of lenses in position, wherein said frame body comprises a primary bridge connected between said two lenses, two side extensions provided at two outer sides of said lenses for coupling with two temples respectively, and two engagement members rearwardly provided on said frame body; and a detachable shelter frame comprising a shelter frame for supporting two auxiliary lenses thereon and two interlocking arrangements which are provided at two sides of said auxiliary lenses respectively for interlocking with said frame body so as to securely mount said detachable shelter frame in front of said primary spectacle frame;

each of said interlocking arrangements comprising a supporting arm rearwardly extending from said shelter frame towards said respective engagement member of said primary spectacle frame for riding over said respective side extension and a magnetic seat which is connected to said respective supporting arm and arranged to magnetically attach to said respective engagement member from behind so as to hold said shelter frame of said detachable shelter frame in front of said frame body of said primary spectacle frame in position;

each of said magnetic seats having a side opening having a width at least equal to a height of the respective engagement member in such a manner that when said magnetic seats are magnetically attached with said engagement members respectively, said engagement members are able to transversely slide through said side openings respectively.

2. The magnetic spectacle set, as recited in claim 1, wherein said two engagement members are rearwardly protruded at two outer sides of said lenses respectively, wherein each of said magnetic seats has an engaging groove formed on a front face thereof and arranged to fittedly receive said respective engagement member when said shelter frame is mounted in front of said frame body so as to further interlock said detachable shelter frame with said primary spectacle frame.

3. The magnetic spectacle set, as recited in claim 2, wherein said side openings are respectively formed at two outer sides of said magnetic seats for said engaging grooves communicating with outside, wherein when said engagement members are magnetically received in said engaging grooves respectively, said engagement members are able to transversely and outwardly slide out of said engaging grooves respectively.

4. The magnetic spectacle set, as recited in claim 3, wherein each of said magnetic seats comprises a magnet housing downwardly connected from said respective supporting arm and a magnet mounted in said magnetic housing and arranged to face toward and align with said respective engagement member of said primary spectacle frame when said detachable shelter frame is mounted in front of said primary spectacle frame.

5. The magnetic spectacle set, as recited in claim 4, wherein each of said magnets has a thickness smaller than a depth of said respective magnetic housing so as to define said engaging groove when said magnet is embedded in said magnetic housing for fittedly engaging with said respective engagement member.

6. The magnetic spectacle set, as recited in claim 5, further comprising a clip bridge extended between said two auxiliary lenses for securely engaging with said primary bridge of said primary spectacle frame so as to further securely mount said detachable shelter frame in front of said primary spectacle frame.

7. The magnetic spectacle set, as recited in claim 2, wherein each of said magnetic seats comprises a magnet housing downwardly connected from said respective supporting arm and a magnet mounted in said magnetic housing and arranged to face toward and align with said respective engagement member of said primary spectacle frame when said detachable shelter frame is mounted in front of said primary spectacle frame.

8. The magnetic spectacle set, as recited in claim 7, wherein each of said magnets has a thickness smaller than a depth of said respective magnetic housing so as to define said engaging groove when said magnet is embedded in said magnetic housing for fittedly engaging with said respective engagement member.

9. The magnetic spectacle set, as recited in claim 2, wherein said side openings are respectively formed at two inner sides of said magnetic housing for said engaging grooves communicating with outside, wherein when said engagement members are magnetically received in said engaging grooves respectively, said engagement members are able to transversely and inwardly slide out of said engaging grooves respectively.

10. The magnetic spectacle set, as recited in claim 9, wherein each of said magnetic seats comprises a magnet housing downwardly connected from said respective supporting arm and a magnet mounted in said magnetic housing and arranged to face toward and align with said respective engagement member of said primary spectacle frame when said detachable shelter frame is mounted in front of said primary spectacle frame.

11. The magnetic spectacle set, as recited in claim 10, wherein each of said magnets having a thickness is smaller than a depth of said respective magnetic housing so as to define said engaging groove when said magnet is embedded in said magnetic housing for fittedly engaging with said respective engagement member.

12. The magnetic spectacle set, as recited in claim 11, further comprising a clip bridge extended between said two auxiliary lenses for securely engaging with said primary bridge of said primary spectacle frame so as to further securely mount said detachable shelter frame in front of said primary spectacle frame.

13. A magnetic spectacle set, comprising:

a primary spectacle frame which comprises a frame body for mounting a pair of lenses in position, wherein said frame body comprises a primary bridge connected between said two lenses, two side extensions provided at two outer sides of said lenses for coupling with two temples respectively, and two engagement members rearwardly provided on said frame body; and a detachable shelter frame comprising a shelter frame for supporting two auxiliary lenses thereon and two interlocking arrangements which are provided at two sides of said auxiliary lenses respectively for interlocking with said frame body so as to securely mount said detachable shelter frame in front of said primary spectacle frame;

each of said interlocking arrangements comprising a supporting arm rearwardly extending from said shelter frame towards said respective engagement member of said primary spectacle frame for riding over said primary bridge and a magnetic seat which is connected to said respective supporting arm and arranged to magnetically attach to said respective engagement member from behind so as to hold said shelter frame of said detachable shelter frame in front of said frame body of said primary spectacle frame in position;

each of said magnetic seats having a side opening having a width at least equal to a height of the respective engagement member in such a manner that when said magnetic seats are magnetically attached with said engagement members respectively, said engagement members are able to transversely slide through said side openings respectively.

14. The magnetic spectacle set, as recited in claim 13, wherein said two engagement members are rearwardly protruded at two inner sides of said lenses respectively, wherein each of said magnetic seats has an engaging groove formed on a front face thereof and arranged to fittedly receive said respective engagement member when said shelter frame is mounted in front of said frame body so as to further interlock said detachable shelter frame with said primary spectacle frame.

15. The magnetic spectacle set, as recited in claim 14, wherein said side openings are respectively formed at two outer sides of said magnetic seat for said engaging grooves communicating with outside, wherein when said engagement members are magnetically received in said engaging grooves respectively, said engagement members are able to transversely and outwardly slide out of said engaging grooves respectively.

16. The magnetic spectacle set, as recited in claim 15, wherein each of said magnetic seats comprises a magnet housing downwardly connected from said respective supporting arm and a magnet mounted in said magnetic housing and arranged to face toward and align with said respective engagement member of said primary spectacle frame when said detachable shelter frame is mounted in front of said primary spectacle frame.

17. The magnetic spectacle set, as recited in claim 16, wherein each of said magnets has a thickness smaller than a depth of said respective magnetic housing so as to define said engaging groove when said magnet is embedded in said magnetic housing for fittedly engaging with said respective engagement member.

18. The magnetic spectacle set, as recited in claim 13, wherein said side openings are respectively formed at two inner sides of said magnetic seat for said engaging grooves communicating with outside, wherein when said engagement members are magnetically received in said engaging grooves respectively, said engagement members are able to transversely and inwardly slide out of said engaging grooves respectively.

19. The magnetic spectacle set, as recited in claim 18, wherein each of said magnetic seats comprises a magnet housing downwardly connected from said respective supporting arm and a magnet mounted in said magnetic housing and arranged to face toward and align with said respective engagement member of said primary spectacle frame when said detachable shelter frame is mounted in front of said primary spectacle frame.

20. The magnetic spectacle set, as recited in claim 19, wherein each of said magnets has a thickness smaller than a depth of said respective magnetic housing so as to define said engaging groove when said magnet is embedded in said magnetic housing for fittedly engaging with said respective engagement member.

21. A detachable shelter frame for mounting in front of a primary spectacle frame which comprises a frame body for mounting a pair of lenses in position, wherein said frame body comprises a primary bridge connected between the two lenses, two side extensions provided at two outer sides of the lenses for coupling with two temples respectively, and two engagement members rearwardly provided on the frame body;

said detachable shelter frame comprising a shelter frame for supporting two auxiliary lenses thereon and two interlocking arrangements which are provided at two sides of said auxiliary lenses respectively, adapted for interlocking with the frame body of the primary spectacle frame so as to securely mount said detachable shelter frame in front of the primary spectacle frame;

each of said interlocking arrangements comprising a supporting arm rearwardly extending from said shelter frame and a magnetic seat which is connected to said respective supporting arm, thereby said supporting arms are adapted for riding over the side extensions and extending towards the engagement members of the primary spectacle frame respectively and said magnetic seats are adapted for magnetically attaching to the engagement members from behind respectively so as to hold said shelter frame of said detachable shelter frame in front of the frame body of the primary spectacle frame in position;

each of said magnetic seats having a side opening at one side end thereof, whereby each of said side openings has a width at least equal to a height of the respective engagement member in such a manner that when said magnetic seats are magnetically attached with the engagement members respectively, the engagement members are able to slide through said side openings respectively.

22. The detachable shelter frame, as recited in claim 21, wherein said side openings are respectively formed at two outer sides of said magnetic seats for said engaging grooves communicating with outside.

23. The detachable shelter frame, as recited in claim 22, wherein each of said magnetic seats comprises a magnet housing downwardly connected from said respective supporting arm and a magnet mounted in said magnetic housing, whereby said magnets are arranged to face toward and align with the engagement members of the primary spectacle frame respectively when said detachable shelter frame is mounted in front of the primary spectacle frame.

24. The detachable shelter frame, as recited in claim 23, wherein each of said magnets has a thickness smaller than a depth of said respective magnetic housing so as to define said engaging groove when said magnet is embedded in said magnetic housing.

25. The detachable shelter frame, as recited in claim 24, further comprising a clip bridge extended between said two auxiliary lenses, thereby said clip bridge is adapted for securely engaging with the primary bridge of the primary spectacle frame so as to further securely mount said detachable shelter frame in front of the primary spectacle frame.

26. The detachable shelter frame, as recited in claim 21, wherein each of said magnetic seats comprises a magnet housing downwardly connected from said respective supporting arm and a magnet mounted in said magnetic housing, whereby said magnets are arranged to face toward and align with the engagement members of the primary spectacle frame respectively when said detachable shelter frame is mounted in front of the primary spectacle frame.

27. The detachable shelter frame, as recited in claim 26, wherein each of said magnets has a thickness smaller than a depth of said respective magnetic housing so as to define said engaging groove when said magnet is embedded in said magnetic housing.

28. The detachable shelter frame, as recited in claim 21, wherein said side openings are respectively formed at two inner sides of said magnetic housing for said engaging grooves communicating with outside.

29. The detachable shelter frame, as recited in claim 28, wherein each of said magnetic seats comprises a magnet housing downwardly connected from said respective supporting arm and a magnet mounted in said magnetic housing, whereby said magnets are arranged to face toward and align with the engagement members of the primary spectacle frame when said detachable shelter frame is mounted in front of the primary spectacle frame.

30. The detachable shelter frame, as recited in claim 29, wherein each of said magnets has a thickness smaller than a depth of said respective magnetic housing so as to define said engaging groove when said magnet is embedded in said magnetic housing.

31. The detachable shelter frame, as recited in claim 30, further comprising a clip bridge extended between said two auxiliary lenses, thereby said clip bridge is adapted for securely engaging with the primary bridge of the primary spectacle frame so as to further securely mount said detachable shelter frame in front of the primary spectacle frame.

32. A detachable shelter frame for mounting in front of a primary spectacle frame which comprises a frame body for mounting a pair of lenses in position, wherein said frame body comprises a primary bridge connected between said two lenses, two side extensions provided at two outer sides of said lenses for coupling with two temples respectively, and two engagement members rearwardly provided on said frame body;

said detachable shelter frame comprising a bridge connected between two auxiliary lenses and two interlocking arrangements which are provided at two sides of said auxiliary lenses respectively and adapted for interlocking with the frame body of the primary spectacle frame so as to securely mount said detachable shelter frame in front of said primary spectacle frame;

each of said interlocking arrangements comprising a supporting arm rearwardly extending from said bridge of said detachable shelter frame and a magnetic seat which is connected to said respective supporting arm, thereby said supporting arms are adapted for riding over the primary bridge and extending towards the engagement members of the primary spectacle frame respectively and said magnetic seats are adapted for magnetically attaching to the engagement members from behind respectively so as to hold said shelter frame of said detachable shelter frame in front of the frame body of the primary spectacle frame in position;

each of said magnetic seats having a side opening at one side end thereof, whereby each of said side openings has a width at least equal to a height of the respective engagement member in such a manner that when said magnetic seats are magnetically attached with the engagement members respectively, the engagement members are able to slide through said side openings respectively.

33. The detachable shelter frame, as recited in claim 32, wherein said side openings are respectively formed at two outer sides of said magnetic seat for said engaging grooves communicating with outside.

34. The detachable shelter frame, as recited in claim 33, wherein each of said magnetic seats comprises a magnet housing downwardly connected from said respective supporting arm and a magnet mounted in said magnetic housing, thereby said magnets are arranged to face toward and align with the engagement members of the primary spectacle frame respectively when the detachable shelter frame is mounted in front of the primary spectacle frame.

35. The detachable shelter frame, as recited in claim 34, wherein each of said magnets has a thickness smaller than a depth of said respective magnetic housing so as to define said engaging groove when said magnet is embedded in said magnetic housing.

36. The detachable shelter frame, as recited in claim 32, wherein said side openings are respectively formed at two inner sides of said magnetic seat for said engaging grooves communicating with outside.

37. The detachable shelter frame, as recited in claim 36, wherein each of said magnetic seats comprises a magnet housing downwardly connected from said respective supporting arm and a magnet mounted in said magnetic housing, whereby said magnets are arranged to face toward and align with the engagement members of the primary spectacle frame respectively when said detachable shelter frame is mounted in front of the primary spectacle frame.

38. The detachable shelter frame, as recited in claim 37, wherein each of said magnets has a thickness smaller than a depth of said respective magnetic housing so as to define said engaging groove when said magnet is embedded in said magnetic housing.

* * * * *